United States Patent
Montoya-Goni et al.

(10) Patent No.: US 11,643,481 B2
(45) Date of Patent: May 9, 2023

(54) ANTACIDS FOR POLYMERS

(71) Applicant: W. R. Grace & Co.-Conn., Columbia, MD (US)

(72) Inventors: Amaia Montoya-Goni, Fulton, MD (US); John Kaarto, Missouri City, TX (US); Michelle Ni Paine, Columbia, MD (US); Jose Manuel Rego, Fulton, MD (US); Feng Gu, Ellicott City, MD (US); Demetrius Michos, Clarksville, MD (US); James Neil Pryor, West Friendship, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 299 days.

(21) Appl. No.: 16/966,348

(22) PCT Filed: Feb. 1, 2019

(86) PCT No.: PCT/US2019/016270
§ 371 (c)(1),
(2) Date: Jul. 30, 2020

(87) PCT Pub. No.: WO2019/152790
PCT Pub. Date: Aug. 8, 2019

(65) Prior Publication Data
US 2020/0369798 A1 Nov. 26, 2020

Related U.S. Application Data

(60) Provisional application No. 62/625,643, filed on Feb. 2, 2018.

(51) Int. Cl.
| | |
|---|---|
| C08F 10/06 | (2006.01) |
| C09D 7/40 | (2018.01) |
| C09D 7/61 | (2018.01) |
| C08J 5/18 | (2006.01) |
| C08K 3/34 | (2006.01) |
| C09D 123/12 | (2006.01) |
| C09D 123/14 | (2006.01) |
| C09J 11/04 | (2006.01) |
| C09J 123/12 | (2006.01) |
| C09J 123/14 | (2006.01) |
| C23F 11/173 | (2006.01) |

(52) U.S. Cl.
CPC .............. *C08F 10/06* (2013.01); *C08J 5/18* (2013.01); *C08K 3/34* (2013.01); *C09D 7/61* (2018.01); *C09D 7/68* (2018.01); *C09D 7/69* (2018.01); *C09D 123/12* (2013.01); *C09D 123/142* (2013.01); *C09J 11/04* (2013.01); *C09J 123/12* (2013.01); *C09J 123/142* (2013.01); *C23F 11/173* (2013.01); *C08J 2323/12* (2013.01); *C08J 2323/14* (2013.01); *C08K 2003/343* (2013.01); *C08K 2201/005* (2013.01)

(58) Field of Classification Search
CPC .......... C08F 10/06; C08J 2323/14; C08J 5/18; C08J 2323/12; C09D 123/12; C09D 123/142; C09D 7/61; C09D 7/68; C09D 7/69; C09J 123/12; C09J 123/142; C09J 11/04; C23F 11/173; C08K 2201/005; C08K 2003/343; C08K 3/34
USPC ........................................................ 524/444
See application file for complete search history.

(56) References Cited

U.S. PATENT DOCUMENTS

| | | |
|---|---|---|
| 3,798,046 A | 3/1974 | Fitton |
| 3,909,286 A | 9/1975 | Fitton |
| 4,251,407 A | 2/1981 | Schroeder et al. |
| 4,339,421 A | 7/1982 | Schultess et al. |
| 4,347,353 A | 8/1982 | Miyata et al. |
| 4,542,061 A | 9/1985 | Fukushima et al. |
| 4,560,609 A | 12/1985 | Fukushima et al. |
| 4,650,818 A | 3/1987 | Oka et al. |
| 4,959,268 A * | 9/1990 | Hagiwara ................ C08K 9/08 423/112 |
| 5,139,760 A | 8/1992 | Ogawa et al. |
| 5,395,547 A | 3/1995 | Broadwell et al. |
| 5,510,413 A | 4/1996 | McCullough et al. |
| 5,582,873 A | 12/1996 | Desai |
| 5,834,541 A | 11/1998 | Becker et al. |

(Continued)

FOREIGN PATENT DOCUMENTS

| | | | |
|---|---|---|---|
| CA | 1 196 178 A | | 11/1985 |
| CN | 1056113 A | | 9/2000 |
| CN | 1344289 A | | 4/2002 |

(Continued)

OTHER PUBLICATIONS

Refractiveindex, Refractiveindex.info website, 2008-2022. (Year: 2008).*
Chemeurope, Chemeurop.com, 1997-2022. (Year: 1997).*
International Search Report dated Apr. 1, 2019, issued in counterpart International Application No. PCT/US2019/016270 (2 pages).
Chinese First Office Action on CN 201980015791.6 dated Aug. 31, 2021.
Chinese Second Office Action on CN 201980015791.6 dated Jan. 19, 2022.

(Continued)

Primary Examiner — Hui H Chin
(74) Attorney, Agent, or Firm — Foley & Lardner LLP

(57) ABSTRACT

The present invention provides polymer compositions having improved corrosivity, color stability and clarity. Also disclosed is a process of preparing the polymers. The process may comprise incorporating into the polymer an acid neutralizing amount of an amorphous aluminum silicate. The amorphous aluminum silicate may be present in the polymer in an amount such that the polymer composition having a Corrosivity Index of less than 6. A refractive index of the amorphous aluminum silicate may be the same or substantially the same as a refractive index of the polymer.

25 Claims, No Drawings

(56) References Cited

U.S. PATENT DOCUMENTS 6,172,153 B1 * 1/2001 Starsinic .................. C08K 3/22
524/400

FOREIGN PATENT DOCUMENTS

| CN | 104817920 | A  | 8/2015  |
|----|-----------|----|---------|
| CN | 105531311 | A  | 4/2016  |
| CN | 105913898 | A  | 8/2016  |
| EP | 0 944 652 | B1 | 9/1999  |
| EP | 0 964 025 | A1 | 12/1999 |
| GB | 925001    | A  | 5/1963  |
| JP | H01-210442|    | 8/1989  |
| RU | 2233845   | C2 | 8/2004  |
| WO | 2006/070400 | A1 | 7/2006 |

OTHER PUBLICATIONS

First Examination Report on IN 202017032815 dated Feb. 7, 2022.
Foreign Action other than Search Report on ID P00202005822 dated Jul. 28, 2022.
Foreign Office Action on Russian patent application No. 2020125538 dated Aug. 16, 2022.
International Preliminary Report on Patentability on PCT Application No. PCT/US2019/016270 dated Aug. 4, 2020 (5 pages).
International Search Report and Written Opinion on PCT Application No. PCT/US2019/016270 dated Apr. 1, 2019 (7 pages).
Foreign Office Action on JP patent application No. 2020 542162 dated Nov. 25, 2022.

* cited by examiner

ANTACIDS FOR POLYMERS

FIELD OF THE INVENTION

The present invention relates to antacids and a method of use thereof. The invention also relates to improved polymer compositions containing the antacids, and products formed from the polymer composition.

BACKGROUND

Polyolefins such as polypropylene have gained a wide range of acceptance and usage in numerous commercial applications owing to their versatility, desirable properties such as excellent mechanical properties and clarity, and general low cost for manufacture. Many industries, especially the packaging industry, utilize these polypropylene materials in a variety of processes such as extrusion, thermoforming, injection molding, or blow molding to create a variety of finished goods.

The process of making polyolefins (e.g., polyethylene and polypropylene) often involves highly active polymerization catalyst, e.g. Ziegler-type catalyst, to produce polymer of acceptable properties without the need for extraction to remove catalyst residues. The catalyst residues that remain in the polymer tend to be acidic and can cause problems when the polyolefins are processed. For example, the presence of acidic material (e.g. in the form of hydrogen chloride) may corrode metal surfaces of polymer processing equipment such as extruders or injection molding equipment.

In addition to the aforementioned problems associated with the polymer, acid residue can also cause problems for products produced from the polymers. For examples, molded products prepared from the polymers may also undergo discoloration or deterioration. Films produced from acid containing polymers can lead to poor film clarity or transparency.

To avoid or minimize such deleterious effects on the polymer and products produced therefrom, an antacid agent is typically incorporated into the polymer during polymer production to neutralize any acidic residues. One antacid agent commercially used in the production and processing of polymers, in particular, polyolefin polymers and products, is calcium stearate. Typically, calcium stearate, or stearic acid (CA) as the product generated from neutralizing the acidic residues, can migrate to the surface of the polymer and cause the surface of the polymer to become sticky or greasy. This material can also lead to smoke in fiber spinning. Moreover, migration of the stearic acid can cause water carry over in raffia and film applications.

Another type of antacid which has been commercially used for the processing or production of polyolefins is hydrotalcite. (See e.g. U.S. Pat. No. 4,347,353). However, these materials are generally more costly than calcium stearate and they tend to generate increase haze in high clarity applications, such as bi-oriented polypropylene (BOPP) applications, thus, making the film appear less appealing.

Other known antacids include crystalline zeolites and zinc oxides. In U.S. Pat. No. 5,510,413, incorporation of a minor proportion of synthetic basic crystalline zeolite as acid acceptor to neutralize or effectively remove the acid components of the unstabilized polymers is disclosed. U.S. Pat. No. 4,251,407 discloses the use of zinc oxide as an acid acceptor in polypropylene.

There is a need in the polymer industry for improved antacid compositions which are cost effective and avoid or inhibit the problems hereto associated with antacids currently used for polymer processing and production.

BRIEF SUMMARY

The present invention addresses the need in the industry for novel antacids for the neutralization of acid impurities in a polymer. In particular, it has been discovered that the utilization of amorphous aluminum silicates as an antacid minimizes the adverse effects of acidic residues formed during polymer processing. Unexpectedly, polymer compositions such as polyolefin polymer compositions utilizing an amorphous aluminum silicate as an antacid have improved properties such as reduced corrosivity and improved color stability, as well as improved clarity with excellent melt flow rate (MFR) stability.

Accordingly, one example of the present invention provides an acid containing polymer composition having enhanced properties of corrosivity, color stability and clarity. The polymer composition may comprise a polymer comprising acid impurities and an acid neutralizing amount of an amorphous aluminum silicate. In one embodiment, the polymer is a polyolefin.

In one embodiment, the invention provides a polymer containing acid impurities having a Corrosivity Index of less than 6 and good color stability. In another embodiment, a refractive index of the amorphous aluminum silicate may be the same or substantially the same as a refractive index of the polymer.

Another embodiment of the present invention also provides a process of preparing the polymer compositions of the invention. Generally, the process may comprise incorporating into a polymer containing acid impurities an acid neutralizing amount of an amorphous aluminum silicate. In another embodiment, the process may comprise incorporating the amorphous aluminum silicate in an amount sufficient to provide a Corrosivity Index of less than 6 in the polymer.

These and other features and advantages of the present invention will become apparent after a review of the following detailed description of the disclosed embodiments and the appended claims.

DETAILED DESCRIPTION

The present disclosure will be described in further detail with reference to embodiments in order to provide a better understanding by those skilled in the art of the technical solutions of the present disclosure.

The following terms, used in the present description and the appended claims, have the following definitions.

The term "amorphous" herein means a material or materials in solid forms that are non-crystalline or lack the long-range order that is characteristic of a crystal. Typically in X-ray diffraction, amorphous solids will scatter X-rays in many directions leading to large bumps distributed in a wide range instead of high intensity narrower peaks for crystalline solids.

A numerical value modified by "about" herein means that the numerical value can vary by 10% thereof.

The term "Corrosivity Index" as used herein means the measure of the potential for a composition to cause corrosion or rust on a metallic surface and is measured using the method as described herein below in the Examples.

The term "neutralizing amount" is used herein to indicate an amount of the amorphous antacid sufficient to neutralize all or substantially all of the acid residues in the polymer. The term "substantially all" is used herein to indicate over 85%, preferably over 90%, of all acid residue in the polymer.

The term "polyolefin" as used herein includes a propylene-based polymer, an ethylene-based polymer, a copolymer of at least one α-olefin with a diene, or a mixture thereof.

The term "propylene-based polymer," also called "polypropylene," as used herein includes a propylene homopolymer, a propylene copolymer, or a mixture thereof.

The process of the present invention is a method of neutralizing an acid in a polymer. The process may comprise contacting a polymer with a neutralizing amount of an amorphous aluminum silicate. The process may also comprise providing an amount of the amorphous aluminum silicate sufficient to provide a desired Corrosivity Index. The polymer may be polyolefin.

In one embodiment, the polyolefin is a propylene-based polymer. The propylene-based polymers that may be used in the present disclosure include for example propylene homopolymer. Alternatively, the propylene-based polymer may be a propylene copolymer. Such propylene copolymer may be a propylene random copolymer. The propylene copolymer may be a copolymer of propylene and at least one α-olefin. The α-olefin may have 2 to 10 carbon atoms. In one embodiment, the α-olefin may be at least one selected from the group consisting of ethylene, 1-butene, 1-pentene, 1-hexene, 1-heptene, 1-octene, 1-nonene, 1-decene, and 4-methyl-1-pentene. Exemplary comonomers utilized in manufacturing the propylene/α-olefin copolymer are C2 to C10 α-olefins; for example, C2, C4, C6 and C8 α-olefins. Alternatively, such propylene copolymer may be a heterophasic propylene polymer. The heterophasic propylene polymer may for example comprise a matrix phase and at least one dispersed phase. The matrix phase of the heterophasic propylene polymer may for example comprise a propylene-based polymer such as a propylene homopolymer or a propylene copolymer. The propylene copolymer may for example be impact copolymer polypropylene (PP) with an ethylene-propylene rubber phase or impact copolymer PP with an α-olefin-propylene rubber phase.

In another embodiment, the polyolefin is an ethylene-based polymer. The ethylene-based polymers that may be used in the present disclosure include ethylene homopolymers such as, for example, high density polyethylene (HDPE). Alternatively, the ethylene-based polymer may be an ethylene copolymer, such, for example, a high density polyethylene (HDPE), a medium density polyethylene (MDPE) or a linear low density polyethylene (LLDPE). The ethylene copolymer may be a copolymer of ethylene and at least one α-olefin. The α-olefin may have 3 to 10 carbon atoms. In one embodiment, the α-olefin may be at least one selected from the group consisting of propylene, 1-butene, 1-pentene, 1-hexene, 1-heptene, 1-octene, 1-nonene, 1-decene, and 4-methyl-1-pentene.

In yet another embodiment, the polyolefin is a copolymer of at least one α-olefin with a diene. The α-olefin comonomer may have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

The particular manner of polyolefin production is not limited herein. The polymer may be suitably produced by a gas-phase process. Alternatively, the polymer may be produced in a liquid-phase or slurry-phase process. The polymerization may be conducted in a continuous, semi-continuous or batch-wise manner and the polymerization system may contain other materials such as molecular hydrogen as known in the art.

The particular manner of contacting the polymer with the desired amount of the amorphous aluminum silicate is not limited herein. In one embodiment, the polymer may be mixed with the amorphous aluminum silicate to form a uniform or non-uniform mixture of the polymer. In a preferred method, the amorphous aluminum silicate/polymer blend may be mixed using an extruder or a mixing device operated at high shear.

Amorphous aluminum silicates, also known as aluminosilicates, useful in the present invention are chemical compounds that are derived from aluminum oxide ($Al_2O_3$) and silicon dioxide ($SiO_2$). The amorphous aluminum silicate may be an amorphous alkali metal/alkaline earth metal aluminum silicate which additionally contains alkali metal and alkaline earth metal. The alkali metal may be selected from the group consisting of lithium, sodium, potassium, rubidium, cesium, francium and mixtures thereof. In one embodiment, the alkali metal is sodium.

The amorphous alkali metal/alkaline earth metal aluminum silicate may also contain at least an alkaline earth metal selected from the group consisting of beryllium, magnesium, calcium, strontium, barium, radium and mixtures thereof. In one embodiment, the alkaline earth metal is magnesium.

In a preferred embodiment, the amorphous alkali metal/alkaline earth metal aluminum silicate is amorphous sodium magnesium aluminum silicate. The magnesium content (in the form of magnesium oxide (MgO)) in the aluminum silicate may vary depending upon the amount of acid groups in the polymer to be neutralized. In one embodiment, the magnesium oxide content ranges from about 0.5 wt % to about 10 wt % of the total amorphous sodium magnesium aluminum silicate. In a preferred embodiment, the magnesium oxide content ranges from 1.0 wt % to about 9.0 wt % of the total amorphous sodium magnesium aluminum silicate. In a most preferred embodiment, the magnesium oxide content ranges from 1.5 wt % to about 8.0 wt % of the total amorphous sodium magnesium aluminum silicate.

Generally, the amorphous aluminum silicates have a mean particle size in a range of about 0.2 μm to about 10.0 μm, preferably about 0.5 μm to 5 μm. The amorphous aluminum silicate may have a pH in a range of 7.0 to 13.0, preferably in a range of 8.0 to 12.0, and more preferably in a range of 9.0 to 11.0.

In one embodiment, the refractive index of the amorphous aluminum silicate may be the same or substantially the same as the refractive index of the polymer. "Substantially the same" herein means that an absolute difference between the two refractive indexes is equal or less than 1.5% of the refractive index of the polymer. Preferably, an absolute difference between the two refractive indexes is equal or less than 1.0% of the refractive index of the polymer.

The amorphous aluminum silicate may be prepared using any conventional means. For example, amorphous aluminum silicate such as sodium magnesium aluminum silicate may be prepared from a precipitation process using sodium silicate, aluminum chloride or sodium aluminate, magnesium chloride and a mineral acid such as sulfuric acid, with preparation processes similar to as described in GB925001, U.S. Pat. Nos. 3,798,046, 3,909,286, 4,339,421, or EP07001534.

The amorphous aluminum silicate is incorporated or blended into the polymer comprising acid impurities in an acid neutralizing amount. In one embodiment, an amount of the amorphous alkali metal/alkaline earth metal aluminum silicate incorporated into the polymer may be in a range of from about 0.005 wt % to about 2.0 wt % of the polymer, preferably in a range of from about 0.010 wt % to about 1.0 wt % of the polymer, and more preferably in a range of from about 0.015 wt % to about 0.8 wt % of the polymer.

In another embodiment, the amount of the amorphous alkali metal/alkaline earth metal aluminum silicate incorporated into the polymer may be an amount sufficient to reduce the Corrosivity Index of the polymer to less than 6, preferably to less than 3, and more preferably to less than 1.

In addition to the amorphous aluminum silicate antacid, the polymer compositions of the invention may include additional components including other polymeric components as well as ingredients or additives conventionally employed in the art for various purposes in polymer compositions, such as dyes, pigments, fillers, antioxidants, secondary antioxidants, antistatic agents, slip agents (e.g erucamide), mould releases, nucleating agents (either polymeric and non-polymeric), UV stabilizers, antiblocks, and fire-retarding agents etc. Typically these additional components will be used in conventional amounts depending on the intended use of the polymer composition.

The particular manner of incorporating amorphous aluminum silicate, and optional additional components, into the polymer is not limited herein. Any conventional methods of mixing a polymer with an amorphous aluminum silicate may be utilized herein. In one embodiment, the polymer is mixed with the neutralizing amount of the amorphous aluminum silicate to form a uniform or non-uniform mixture of the polymer and the amorphous aluminum silicate by an extruder or a mixing device operated at high shear. In one embodiment the polymer is mixed with the amorphous aluminum silicate in a molten state. In another embodiment, a mixture of the polymer and the amorphous aluminum silicate is heated to melt the polymer. Thereafter the molten mixture is mixed as described herein above to form a uniform or non-uniform mixture. In yet another embodiment, the polymer and the amorphous aluminum silicate may be dissolved in a suitable solvent to form a solution or a dispersion, which may then be casted and dried to form the polymer composition.

Polymer compositions of the invention possess enhanced properties of corrosivity, color stability and clarity. Unexpectedly, the polymers compositions exhibit increased corrosivity as evidenced by a Corrosion Index of a less than 6, preferably to less than 3, and more preferably to less than 1. The polymer composition also exhibits increased clarity. Generally, the clarity of the polymer composition is at least about 60%, preferably at least about 65%, as measured on an injection molding (IM) plaque having a thickness of about 1 mm. Details of measuring the clarity of the polymer composition are further described below in the Examples.

The polymer compositions of the invention can be processed to provide a variety of products conventionally made with polymers. Such products may include, for example, articles such as films, fibers, molded articles, extruded profiles, sheets, boards, adhesives, foams, wire coatings or other fabricated parts. Articles prepared from the polymer composition may be prepared according to conventional means such as extrusion, blow molding, cast film processing or injection molding. In one embodiment, the article is a film or a fiber.

Articles prepared using polymer/antacid compositions in accordance with the present invention possess reduced acidic residues that could be harmful to the processing equipment. Moreover, articles requiring clear or transparent polymer compositions exhibit improved clarity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, the present invention will be described in more detail with reference to Examples. However, the scope of the present invention is not limited to the following Examples.

EXAMPLES

The following examples describe the present invention of incorporating amorphous aluminum silicate antacids and several other types of antacid materials into polypropylene, the testing methods and comparison results. These examples are intended for illustration purposes only and are not intended to limit the scope of the present invention.

Materials

A Homopolymer polypropylene powder sample of 2.9 g/10 min (ASTM D-1238) (as measured) was made at Grace UNIPOL® PP pilot plant with CONSISTA® catalyst.

Primary antioxidant Irganox® 1010 and secondary antioxidant Irgafos® 168 were acquired from BASF. In all examples described below, consistence levels of 500 ppm of Irganox® 1010 and 750 ppm of Irgafos® 168 were used. CaSt (calcium stearate) from Faci (Jurong Island, Singapore) and magnesium aluminum hydroxide carbonate (hydrate) from Kyowa (Japan). Amorphous calcium ion exchanged silica (calcium ion-exchanged silica gel) from W.R. Grace. Crystalline sodium aluminosilicates 1 and 2 (zeolite) were commercial crystalline sodium aluminosilicate particles with different pore diameters (4 Å and 8 Å, respectively), and both were supplied by W.R. Grace. Amorphous sodium magnesium aluminosilicates were prepared as described below.

Typically, the amount of antacid used in all samples was either 180 ppm or 300 ppm as described in the examples below.

TABLE 1

Physical properties of the antacid additives.

| MaterialType | Refractive Index (difference from bulk PP) | Median Particles Size (μm) | Surface area m²/g) | Pore volume (cc/g) | pH |
|---|---|---|---|---|---|
| Calcium Stearate | n/a | n/a | n/a | n/a | n/a |
| magnesium aluminum hydroxide carbonate | 1.525 (0.020) | 0.5 | 11 | n/a | 9.5 |
| Amorphous calcium ion exchanged silica | 1.440 (0.065) | 3.0 | <100 | <0.4 | 9.5 |
| Crystalline sodium aluminosilicate 1 | 1.450 (0.055) | 4.0 | N/A | ~0.3 | 10.5 |

TABLE 1-continued

Physical properties of the antacid additives.

| Material Type | Refractive Index (difference from bulk PP) | Median Particles Size (μm) | Surface area m$^2$/g) | Pore volume (cc/g) | pH |
|---|---|---|---|---|---|
| Crystalline sodium aluminosilicate 2 | 1.450 (0.055) | 8.0 | N/A | ~0.3 | 10.5 |
| Amorphous sodium magnesium aluminosilicate, Sample 1 | 1.495 (0.010) | 5.5 | 80 | ~0.3 | 11.0 |

Preparation of Amorphous Sodium Magnesium Aluminosilicate

Samples 1-6 of amorphous sodium magnesium aluminosilicate with different Mg content were prepared as follows: A precipitation process was initiated by adding aqueous solution of aluminum sulfate and magnesium chloride (predetermined ratios with desired amount of Mg content), with strong stirring to sodium silicate solution (0.8% SiO$_2$) to lower the solution pH to 8.9 at 84° C. in 5 minutes. After 5 minutes, both aluminum sulfate/magnesium chloride and sodium silicate solution were added simultaneously in such a ratio to the solution that the pH of the solution remained at about 8.9 during the course of the addition. The total reaction time was about 74 minutes. After the addition was completed, the precipitated particles were filtered and washed with DI water 5 times, and then they were dried at 120° C. overnight and milled to desired particle size utilizing fluid energy mill or jet mill or small scale analytical mill.

Determination of Mg Content in the Amorphous Sodium Magnesium Aluminosilicate Using Inductively Coupled Plasma (ICP)

About 0.5 g of the aluminosilicate particles were added in a Teflon digestion tube with 47 mm ID and 214 mm height. 1 mL of 40 ppm cobalt salt solution was added into the aluminosilicate as internal standard. 25 ml 60% HClO$_4$, 5 ml 69% HNO$_3$, 3 ml 37% HCl, and 12 ml 48% HF were added into the container. The mixture was placed on a heat block and digest at 550 F for 90 minutes. Then, the remaining solution was diluted to 250 mL with DI water. The cooled sample was analyzed on Spectro Arcos II instrument.

Titration of the Amorphous Sodium Magnesium Aluminosilicate in Water 3 grams of amorphous sodium magnesium aluminosilicates were slurried in 40 ml of water, and the slurry was titrated to pH 6.0 with 0.1M HCl. The volumes of consumed HCl were recorded.

Table 2 lists the amount of MgO and titrated volumes of HCl for Samples 1-6 of amorphous sodium magnesium aluminosilicate as prepared above:

TABLE 2

| Sample Number | MgO Content (%) | 0.1N HCl Consumed (ml) |
|---|---|---|
| 1 | 2.00 | 20.1 |
| 2 | 1.92 | 21.4 |
| 3 | 3.35 | 24.8 |
| 4 | 4.24 | 23.3 |
| 5 | 4.75 | 34.2 |
| 6 | 5.37 | 38.4 |

As can be seen from Table 2, the titration volume of HCl is proportional to the amount of MgO as composition in the samples.

Nitrogen Pore Volume and Particle Size Measurement for the Particles

Nitrogen pore volumes of the aluminosilicate or other particles were measured using an Autosorb® iQ analyzer, available from Quantachrome Instrument (Boynton Beach, Fla.). Nitrogen adsorption and desorption isotherms were measured at 77K with nitrogen pressure increasing from 0.01% atmosphere to 0.998% atmosphere, and subsequently decreasing from 0.998% atmosphere to 0.025% atmosphere, respectively. The pore volumes were calculated using the AsiQwin™ 5.0 version program based on BJH theory. See, for example, Barrett et al., The Determination of Pore Volume and Area Distributions in Porous Substances. I. Computations from Nitrogen Isotherms, J. Am. Chem. Soc., 1951, 73 (1), pp 373-380. Subject matter of which is incorporated herein by reference in its entirety.

The particle sizes reported in the Examples were determined by light scattering using a Malvern Mastersizer 2000 or 3000 available from Malvern Instruments Ltd., per ASTM B822-10.

Process and Testing Methods

Polymer Extrusion and Extrusion Conditions

The sample of 2.9 g/10 min (ASTM D-1238) as measured was extruded with antacid additives with amounts as indicated below in the examples.

The sample formulations were dry tumble mixed and then pelletized on a W&P 28 mm twin-screw extruder with a high energy screw configuration. The extruder was run at 300 rpm, with a 210-220-235-235° C. temperature profile (from feed hopper to die) with a strand die feeding into a 50° C. water batch followed by the pelletizing unit. The feed throat was maintained under a N$_2$ blanket. Pellets made from this step were considered zero extruder pass and used for MFR, corrosivity, clarity and Yellowness index (YI) tests.

Each of the formulations was then (re-)extruded three additional times in this W&P 28 mm twin-screw extruder under the same conditions as described above.

Melt Flow Rate (MFR) and Yellowness Index (YI) Measurement

MFRs were measured following ASTM D1238 via a Tinius Olsen Melt Indexer MP993 (for PP, tests were run using 2.16 kg at 230° C.). Yellowness indexes of all the pellets were measured on a Hunter Lab Scan XE benchtop Spectrophotometer following ASTM D6290. Reflective index (RI) measurement Accurate RIs were measured following ASTM C1648 via the Becke line technique on a Nikon phase contrast microscope in a dark field mode. The RI matching liquids were purchased from Cargille Laboratories (Cedar Grove, N.J. 07009, USA). Refractive index of a polypropylene film was measured to be 1.505. This value was used as bulk material refractive index.

Corrosion Test

The corrosion inhibition capability of antacids was measured on carbon steel plates (soft iron sheet: 5 cm×5 cm with 0.07 cm thickness) using the following procedures.

Carbon steel plates were polished with pumice powder with a brass brush to expose fresh surface. Surface area of plates was calculated based on the dimensions of the plates, and thus SA=5×5×2+0.07×5×4. Formulated pellets were placed in aluminum pans and heated in the oven at 230° C. Then, these freshly polished steel plates were placed in polymer melt (230° C.) and left for four hours. The plates were then taken from polymer melt and polymer on plate surface was wiped off. Then plates were weighed ($m_0$, initial weight) and then were allowed to stand in a humidity chamber with ~75% relative humidity at room temperature for one week. After one week, plates were taken out of chamber and carefully weighed ($m_1$, weight after corrosion). Corrosivity index was calculated according to Equation 1.

$$\text{Corrosivity Index } (CI) = \frac{m1 - m0}{SA} \qquad \text{Equation 1}$$

As can be seen from the equation, the closer the Corrosivity Index is to 0, the less corrosion happens.

Clarity Measurement

Multi-thickness plaques were made on an Arburg Allrounder 221 k 28 Ton injection molder with a 25 mm barrel. The injection molder used an injection speed of 13.8 mm/sec. The barrel temperature was set to 260° C. (nozzle). A single stage injection profile was used and the mold temperature was set to 40° C. (±2° C.). Backpressure was set to 0 bar. Table 3 lists the cycle times set up for molding process.

TABLE 3

| Injection molding parameter setup | |
|---|---|
| Delay Injection | 0.3 sec |
| Injection | 3.0-4.0 sec |
| Holding | 6.0 sec |
| Cooling | 12.0 sec |
| Mold Open | ~5.0 sec |

After molding, plaques were conditioned for 72 hours at 23° C.±2° C. under 50±10% relative humidity and tested for clarity following ASTM D1746 on a BYK Gardner Haze-Gard Plus 4725.

Example 1

The polypropylene described above was blended and extruded with 180 ppm of sample 1 of amorphous sodium magnesium aluminosilicate.

Example 2

The polypropylene described above was blended and extruded with 300 ppm of sample 1 of amorphous sodium magnesium aluminosilicate.

Comparative Example 1

The polypropylene described above was blended and extruded without any antacid additive.

Comparative Example 2

The polypropylene described above was blended and extruded with 300 ppm of calcium stearate.

Comparative Example 3

The polypropylene described above was blended and extruded with 180 ppm of magnesium aluminum hydroxide carbonate.

Comparative Example 4

The polypropylene described above was blended and extruded with 180 ppm of amorphous calcium ion exchanged silica.

Comparative Example 5

The polypropylene described above was blended and extruded with 300 ppm of amorphous calcium ion exchanged silica.

Comparative Example 6

The polypropylene described above was blended and extruded with 180 ppm of crystalline sodium aluminosilicate 1.

Comparative Example 7

The polypropylene described above was blended and extruded with 300 ppm of crystalline sodium aluminosilicate 1.

Comparative Example 8

The polypropylene described above was blended and extruded with 180 ppm of crystalline sodium aluminosilicate 2.

Comparative Example 9

The polypropylene described above was blended and extruded with 300 ppm of crystalline sodium aluminosilicate 2.

The test results for all the examples (Exp 1 and Exp 2), comparative examples (CE1-CE9) were listed in the following Table 4.

TABLE 4

| | Exp 1 | Exp 2 | CE1 | CE2 | CE3 | CE4 | CE5 | CE5 | CE7 | CE8 | CE9 |
|---|---|---|---|---|---|---|---|---|---|---|---|
| Corrosivity index, g/m² | 1.7 | 0.0 | 6.4 | 0.1 | 0.0 | 41 | 2.6 | 0.8 | 0.0 | 1.8 | 0.1 |
| 1 mm step chip Clarity, % | 64 | 67 | 28 | 41 | 55 | 31 | 31 | 35 | 34 | 41 | 39 |
| 1.6 mm step chip Clarity, % | 47 | 50 | 16 | 27 | 36 | 18 | 18 | 21 | 20 | 24 | 23 |
| MFR (pellet)zero pass, g/10 min | 3.4 | 3.7 | 3.6 | 3.3 | 3.2 | 3.6 | 3.4 | 3.3 | 3.5 | 4.0 | 3.6 |
| MFR (pellet) 1st pass, g/10 min | 4.3 | 4.4 | 4.3 | 3.8 | 4.0 | 4.2 | 4.1 | 3.9 | 4.0 | 4.7 | 4.2 |
| MFR (pellet) 3rd pass, g/10 min | 5.7 | 5.8 | 5.9 | 4.9 | 5.3 | 5.6 | 5.6 | 5.1 | 5.5 | 6.6 | 5.3 |
| YI (pellet) zero pass | 4.6 | 5.1 | 4.3 | 0.4 | 4.1 | 6.3 | 7.9 | 12.3 | 13.4 | 2.2 | 3.8 |
| YI (pellet) 1st pass | 7.7 | 7.8 | 9.9 | 3.5 | 9.7 | 10.9 | 11.1 | 19.5 | 21.1 | 5.6 | 7.2 |
| YI (Pellet) 3rd pass | 12.1 | 11.6 | 15.4 | 7.5 | 11.2 | 15.9 | 15.0 | 26.3 | 29.7 | 9.2 | 11.2 |

As shown in Table 4, unexpectedly, polyolefin compositions containing amorphous magnesium aluminum silicates improve clarity significantly with excellent MFR and color stability and reduced corrosivity compared with a non-stabilized system and those stabilized with other types of antacids.

The invention claimed is:

1. A method of neutralizing an acid in a polymer, the method comprising contacting a polymer with an amount of an amorphous alkali metal/alkaline earth metal aluminum silicate, wherein the amount of the amorphous alkali metal/alkaline earth metal aluminum silicate in the polymer is in a range of from 0.005 wt % to 2.0 wt % of the polymer; and the amorphous alkali metal/alkaline earth metal aluminum silicate contains (1) at least an alkali metal selected from the group consisting of lithium, sodium, potassium, rubidium, cesium, and mixtures thereof, and (2) at least an alkaline earth metal selected from the group consisting of beryllium, magnesium, calcium, strontium, barium, radium and mixtures thereof.

2. The method of claim 1, wherein the polymer is polyolefin, and the polyolefin is a propylene-based polymer, an ethylene-based polymer, a copolymer of at least one α-olefin with a diene, or a mixture thereof.

3. The method of claim 2, wherein the propylene-based polymer is a propylene homopolymer, a propylene copolymer, or a mixture thereof;
wherein the propylene copolymer is a propylene random copolymer; or
the propylene copolymer is a copolymer of propylene and at least one α-olefin, and the α-olefin has 2 to 10 carbon atoms, and the α-olefin is at least one selected from the group consisting of ethylene, 1-butene, 1-pentene, 1-hexene, 1-heptene, 1-octene, 1-nonene, 1-decene, and 4-methyl-1-pentene; or
the propylene copolymer is a heterophasic propylene polymer, the heterophasic propylene polymer comprises a matrix phase and at least one dispersed phase, and the matrix phase of the heterophasic propylene polymer comprises a propylene homopolymer or a propylene copolymer.

4. The method of claim 2, wherein the ethylene-based polymer is an ethylene homopolymer, an ethylene copolymer, or a mixture thereof;
wherein the ethylene copolymer is a copolymer of ethylene and at least one α-olefin, wherein the α-olefin has 3 to 10 carbon atoms; and the α-olefin is at least one selected from the group consisting of propylene, 1-butene, 1-pentene, 1-hexene, 1-heptene, 1-octene, 1-nonene, 1-decene, and 4-methyl-1-pentene; or
the ethylene-based polymer is a HDPE or a LLDPE.

5. The method of claim 2, wherein the polyolefin is the copolymer of at least one α-olefin with a diene, wherein the α-olefin has no more than 20 carbon atoms.

6. The method of claim 1, wherein
the amorphous alkali metal/alkaline earth metal aluminum silicate is amorphous sodium magnesium aluminum silicate;
optionally wherein the amorphous sodium magnesium aluminum silicate comprises magnesium oxide in an amount of 0.5 wt % to about 10 wt % of the total amorphous sodium magnesium aluminum silicate.

7. The method of claim 6, wherein the amorphous sodium magnesium aluminum silicate has a mean particle size in a range of about 0.5 μm to about 10.0 μm; or the amorphous sodium magnesium aluminum silicate has a pH in a range of 7 to 12.

8. The method of claim 1, wherein a refractive index of the amorphous alkali metal/alkaline earth metal aluminum silicate is substantially the same as a refractive index of the polymer.

9. A process of reducing corrosivity of a polymer containing acidic impurities, the process comprising: incorporating into the polymer an amount of an amorphous alkali metal/alkaline earth metal aluminum silicate to obtain a polymer composition having a Corrosivity Index of less than 6, wherein the amount of the amorphous alkali metal/alkaline earth metal aluminum silicate in the polymer is in a range of from 0.005 wt % to 2.0 wt % of the polymer; and the amorphous alkali metal/alkaline earth metal aluminum silicate contains (1) at least an alkali metal selected from the group consisting of lithium, sodium, potassium, rubidium, cesium, and mixtures thereof, and (2) at least an alkaline earth metal selected from the group consisting of beryllium, magnesium, calcium, strontium, barium, radium and mixtures thereof.

10. The process of claim 9, wherein the polymer is polyolefin, and the polyolefin is a propylene-based polymer, an ethylene-based polymer, a copolymer of at least one α-olefin with a diene, or a mixture thereof.

11. The process of claim 10, wherein the propylene-based polymer is a propylene homopolymer, a propylene copolymer, or a mixture thereof;

wherein the propylene copolymer is a propylene random copolymer; or the propylene copolymer is a copolymer of propylene and at least one α-olefin, wherein the α-olefin has 2 to 10 carbon atoms, and the α-olefin is at least one selected from the group consisting of ethylene, 1-butene, 1-pentene, 1-hexene, 1-heptene, 1-octene, 1-nonene, 1-decene, and 4-methyl-1-pentene; or the propylene copolymer is a heterophasic propylene polymer, wherein the heterophasic propylene polymer comprises a matrix phase and at least one dispersed phase, and the matrix phase of the heterophasic propylene polymer comprises a propylene homopolymer or a propylene copolymer.

12. The process of claim 10, wherein the ethylene-based polymer is an ethylene homopolymer, an ethylene copolymer, or a mixture thereof, wherein the ethylene copolymer is a copolymer of ethylene and at least one α-olefin, wherein the α-olefin has 3 to 10 carbon atoms, and the α-olefin is at least one selected from the group consisting of propylene, 1-butene, 1-pentene, 1-hexene, 1-heptene, 1-octene, 1-nonene, 1-decene, and 4-methyl-1-pentene; or the ethylene-based polymer is a HDPE or a LLDPE.

13. The process of claim 10, wherein the polyolefin is the copolymer of at least one α-olefin with a diene, wherein the α-olefin has no more than 20 carbon atoms.

14. The process of claim 9, wherein the amorphous alkali metal/alkaline earth metal aluminum silicate is amorphous sodium magnesium aluminum silicate;

optionally wherein the amorphous sodium magnesium aluminum silicate comprises magnesium oxide in an amount of 0.5 wt % to about 10 wt % of the total amorphous sodium magnesium aluminum silicate.

15. The process of claim 9, wherein the amorphous alkali metal/alkaline earth metal aluminum silicate has a mean particle size in a range of from about 0.5 μm to about 10.0 μm, or the amorphous sodium magnesium aluminum silicate has a pH in a range of 7 to 12.

16. The process of claim 9, wherein the polymer composition has a Corrosivity Index of the polymer to less than 1.

17. The process of claim 9, wherein a refractive index of the amorphous alkali metal/alkaline earth metal aluminum silicate is substantially the same as a refractive index of the polymer, and clarity of the polymer composition is at least about 60% as measured on an IM plaque having a thickness of about 1 mm.

18. A polymer composition having reduced corrosivity comprising a polymer comprising acid impurities and an amount of amorphous sodium magnesium aluminum silicate, wherein the amount of the amorphous sodium magnesium aluminum silicate in the polymer is in a range of from 0.005 wt % to 2.0 wt % of the polymer.

19. The polymer composition of claim 18, wherein the polymer is polyolefin, the polyolefin is a propylene-based polymer, an ethylene-based polymer, a copolymer of at least one α-olefin with a diene, or a mixture thereof;

wherein the propylene-based polymer is a propylene homopolymer, a propylene copolymer, or a mixture thereof;

wherein the propylene copolymer is a propylene random copolymer, or the propylene copolymer is a copolymer of propylene and at least one α-olefin, wherein the α-olefin has 2 to 10 carbon atoms, and the α-olefin is at least one selected from the group consisting of ethylene, 1-butene, 1-pentene, 1-hexene, 1-heptene, 1-octene, 1-nonene, 1-decene, and 4-methyl-1-pentene, or the propylene copolymer is a heterophasic propylene polymer, wherein the heterophasic propylene polymer comprises a matrix phase and at least one dispersed phase, and the matrix phase of the heterophasic propylene polymer comprises a propylene homopolymer or a propylene copolymer.

20. The polymer composition of claim 19, wherein the ethylene-based polymer is an ethylene homopolymer, an ethylene copolymer, or a mixture thereof, wherein the ethylene copolymer is a copolymer of ethylene and at least one α-olefin, wherein the α-olefin has 3 to 10 carbon atoms, the α-olefin is at least one selected from the group consisting of propylene, 1-butene, 1-pentene, 1-hexene, 1-heptene, 1-octene, 1-nonene, 1-decene, and 4-methyl-1-pentene, or the ethylene-based polymer is a HDPE or a LLDPE.

21. The polymer composition of claim 19, wherein the polyolefin is the copolymer of at least one α-olefin with a diene, wherein the α-olefin has no more than 20 carbon atoms.

22. The polymer composition of claim 18, wherein the amorphous sodium magnesium aluminum silicate has a mean particle size in a range of from about 0.5 μm to about 10.0 μm, or the amorphous aluminum silicate has a pH in a range of 7 to 12.

23. The polymer composition of claim 18, wherein clarity of the polymer composition is at least about 60% as measured on an IM plaque having a thickness of about 1 mm.

24. An article made from the polymer composition of claim 18, wherein the article is at least one selected from the group consisting of fibers, molded articles, extruded profiles, sheet, board, adhesives, foam, and wire coatings.

25. The article made from the polymer composition of claim 18, wherein the article is a film or sheet or a fiber or a molded article.

* * * * *

UNITED STATES PATENT AND TRADEMARK OFFICE
CERTIFICATE OF CORRECTION

PATENT NO.        : 11,643,481 B2
APPLICATION NO.   : 16/966348
DATED             : May 9, 2023
INVENTOR(S)       : Amaia Montoya-Goni et al.

It is certified that error appears in the above-identified patent and that said Letters Patent is hereby corrected as shown below:

In the Claims

Claim 16, Column 13, Line 41-42, "wherein the polymer composition has a Corrosivity Index of the polymer to less than 1" should be replaced with -- wherein the polymer composition has a Corrosivity Index of less than 1 --

Signed and Sealed this
Eighth Day of October, 2024

Katherine Kelly Vidal
*Director of the United States Patent and Trademark Office*